United States Patent [19]
Agravante et al.

[11] Patent Number: 5,767,793
[45] Date of Patent: Jun. 16, 1998

[54] COMPACT VEHICLE BASED REAR AND SIDE OBSTACLE DETECTION SYSTEM INCLUDING MULTIPLE ANTENNAE

[75] Inventors: Hiroshi H. Agravante, Long Beach; Bruce I. Hauss, Los Angeles; Philip J. Moffa, Torrance, all of Calif.

[73] Assignee: TRW Inc., Redondo Beach, Calif.

[21] Appl. No.: 426,376

[22] Filed: Apr. 21, 1995

[51] Int. Cl.⁶ ............................................. G08G 1/16
[52] U.S. Cl. .................. 340/903; 340/401; 340/435; 180/167; 180/169; 342/70; 342/29
[58] Field of Search .................. 340/903, 901, 340/435, 436; 180/169, 167; 342/70, 71, 72, 29, 41

[56] References Cited

U.S. PATENT DOCUMENTS

| | | | |
|---|---|---|---|
| 3,697,985 | 10/1972 | Faris et al. | 343/510 |
| 3,846,796 | 11/1974 | Oishi et al. | 342/72 |
| 4,028,662 | 6/1977 | Young | 340/903 |
| 4,210,357 | 7/1980 | Adachi | 343/713 |
| 4,349,823 | 9/1982 | Tagami et al. | 343/7 UM |
| 4,528,563 | 7/1985 | Takeuchi | 340/903 |
| 4,684,295 | 8/1987 | Miller et al. | 340/903 |
| 4,845,506 | 7/1989 | Shibata et al. | 343/713 |
| 4,910,523 | 3/1990 | Huguenin et al. | 342/179 |
| 4,920,520 | 4/1990 | Gobel et al. | |
| 5,008,678 | 4/1991 | Herman | 342/158 |
| 5,028,920 | 7/1991 | Dombrowski | 340/904 |
| 5,087,918 | 2/1992 | May et al. | 342/85 |
| 5,115,245 | 5/1992 | Wen et al. | 342/175 |
| 5,202,692 | 4/1993 | Huguenin et al. | 342/179 |
| 5,235,316 | 8/1993 | Qualizza | 340/436 |
| 5,281,947 | 1/1994 | Durley et al. | 340/433 |
| 5,315,303 | 5/1994 | Tsou et al. | 342/27 |
| 5,339,075 | 8/1994 | Abst et al. | 340/903 |
| 5,341,344 | 8/1994 | O'Brien et al. | |

OTHER PUBLICATIONS

Automotive Radar: A Brief Review, Dale M. Grimes Proceedings of the IEEE, vol. 62, No. 6, Jun. 1974.

Primary Examiner—Jeffery Hofsass
Assistant Examiner—Julie Lieu
Attorney, Agent, or Firm—Michael S. Yatsko

[57] ABSTRACT

A rear and side object detection system for a vehicle based on monolithic millimeter wave integrated circuit technology. A multiple antenna configuration is employed that defines six sensing regions to the right, left and the rear of the vehicle. A sixth sensing region is defined at the right side of the vehicle, a second sensing region is defined at the right side and rear of the vehicle and overlaps the sixth sensing region, a fourth sensing region and a first sensing region extend from the rear on both sides of the vehicle in the adjacent lanes, a third sensing region is defined at the left side of the vehicle and a fifth sensing region is defined at the left side and rear of the vehicle and overlaps the second and third sensing regions. A right side warning signal is issued if an object is detected in a right side detection zone defined by the sixth sensing region or a portion of the second sensing region that does not overlap the fourth or fifth sensing regions. Likewise, a left side warning signal is issued if an object is detected in a left side detection zone defined by the third region and a portion of the fifth sensing region that does not overlap the second or first sensing regions. A back-up warning signal is issued if an object is detected in an overlap region between the second and fifth sensing regions.

2 Claims, 4 Drawing Sheets

COMPACT VEHICLE BASED REAR AND SIDE OBSTACLE DETECTION SYSTEM INCLUDING MULTIPLE ANTENNAE

BACKGROUND OF THE INVENTION

1. Field of the Invention

This invention relates generally to a rear and side object detection system for a vehicle and, more particularly, to a rear and side object detection system for a vehicle that incorporates an antenna configuration that defines overlapping antenna fields around the vehicle where the antenna fields combine to give an accurate detection of obstacles within a desirable obstacle detection region.

2. Discussion of the Related Art

For current vehicle transportation, there is a significant number of incidences involving vehicle collisions with obstacles, such as other vehicles, when the vehicle is changing travel lanes or merging, and when the vehicle is operating in reverse. The main reason why the lane change/ merge and reverse operation incidences occur is because the vehicle operator is unaware of the obstacles in the vehicle's intended path. Many factors relate to why the vehicle operator would be unaware of the obstacles. These factors include operator fatigue, carelessness, distraction by other conditions, and blocked vision. This suggests that many of these crash incidences can be avoided by vehicle based countermeasures that inform the vehicle operator of the presence of an obstacle when the vehicle operator initiates a lane change or back-up maneuver.

Currently, progress is being made in the applicable technological fields to achieve an effective rear and side object detection system that informs a vehicle operator of an impending collision with many types of objects that may be present within the vehicle's intended path. In most practical detection systems of this type, radar technology is utilized. Particularly, a radio wave signal at a desirable frequency is emitted from the detection system to define a desirable sensing zone around the vehicle, and reflected signature signals from objects within the zone are received by the system to be analyzed. Positional information from the signature signals and the relative timing between the transmitted radio wave signal and the reflected signature signals provide an indication of the location, distance and speed of the objects. A background discussion of typical obstacle detection systems known in the art can be found in U.S. Pat. Nos. 5,087,918; 5,008,678; 4,349,823 and 3,697,985.

It does not appear that the current technology has reached a level that would make radar detection systems feasible in a wide variety of mass produced vehicles. This is because of a number of necessary design criteria required for a practical detection system. Generally, the detection system must be low cost and readily adaptable to various types of vehicles with respect to consumer demands and industry standards. More importantly, the detection system must be reliable in that the system must give a warning indication of an obstacle of the type that may cause a collision for a high percentage of the times, and not provide a warning or nuisance signal for those objects that do not provide a chance of collision.

To achieve reliable object detection, the detection system must accurately define sensing zones around the vehicle. The requirement for highly defined sensing zones can be realized by understanding the following situation. The detection system must emit a signal of a sufficient power that will cause a small child to generate a significant reflection signature signal if the child is behind the vehicle in a potentially hazardous position. However, it would be undesirable to provide a warning signal of a metal obstacle that was significantly distanced from the back of the vehicle where it would not be a potential collision hazard. Because the metal object would provide a much greater reflection signature than the child when at the same distance for the same power level, the design of the system must define the sensing zones to separate these two events to be practical.

To detect objects in the proximity of a vehicle to be effective against lane change/merge and back-up collisions, the detector system must be able to cover specific areas to the left, right and back of the vehicle. In order to create this necessary coverage without sacrificing aesthetics and to avoid packaging problems, a multiple detector system configuration is necessary. However, it becomes important from a design standpoint to limit the number of power sources and antenna in the system because of space and cost constraints.

What is needed is a rear and side obstacle detection system that accurately defines effective sensing areas around a vehicle so as to give a high probability of detection when a potential collision causing obstacle is within the sensing areas, and prevent the system from indicating an obstacle is present when one is not present in the sensing areas. It is therefore an object of the present invention to provide such a rear and side object detection system.

SUMMARY OF THE INVENTION

In accordance with the teaching of the present invention, a rear and side obstacle detection system that provides a warning of an obstacle that is within specified sensing regions around a vehicle is disclosed. A multiple antenna configuration is employed that defines six sensing regions to the right, left and rear of the vehicle. The antenna configuration is designed such that the sensing regions accurately sense strategic areas around the vehicle that are limited to adjacent lanes on either side of the vehicle and an appropriate back-up area behind the vehicle. A sixth sensing region is defined at the right side of the vehicle, a second sensing region is defined at the right side and rear of the vehicle and overlaps the first sensing region, a fourth sensing region and a first sensing region extend from the rear on both sides of the vehicle along the adjacent lanes, a third sensing region is defined at the left side of the vehicle, and a fifth sensing region is defined at the left side and rear of the vehicle and overlaps the second and third sensing regions.

A right side warning signal is given if an obstacle is detected in a right side detection zone defined by the sixth sensing region or a portion of the second sensing region that doesn't overlap the fourth or fifth sensing regions. Likewise, a left side warning signal is given if an obstacle is detected in a left side detection zone defined by the third sensing region and a portion of the fifth sensing region that does not overlap the second or first sensing regions. A back-up warning signal is given if an obstacle is detected in an overlap region between the second and fifth sensing regions. The fourth and first sensing regions detect obstacles that are traveling at a speed that will cause the obstacle to enter the right or left side detection zones within a predetermined period of time so as to issue an appropriate right or left side warning signal.

In one embodiment, the detection system comprises two sensing units positioned at the rear of the vehicle on the left and right sides. Each of the sensing units incorporates three antenna arrays specially designed to define the six sensing regions. The sensors are based on monolithic millimeter wave integrated circuit technology such that a single power source associated with each unit provides power to the three antenna arrays.

3

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments directed to a rear and side obstacle detection system for detecting obstacles around a vehicle is merely exemplary in nature and is in no way intended to limit the invention or its applications or uses.

Figure 1:
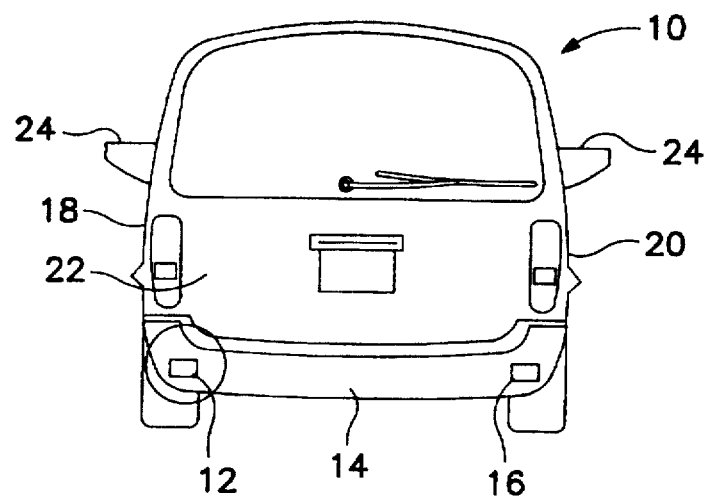
FIG. 1 is a rear view of a vehicle incorporating a rear and side obstacle detection system according to an embodiment of the present invention.

FIG. 1 shows a rear view of a vehicle 10. The vehicle 10 is intended to represent any type of vehicle adaptable to operate on a conventional highway system. The vehicle 10 includes a left side sensor 12 positioned within a left end of a bumper 14 associated with the vehicle 10 and a right side sensor 16 positioned within a right end of the bumper 14. As will be discussed in detail below, the sensors 12 and 16 emit a radio wave signal that defines sensing regions (see FIGS. 6 and 7) around a left side 18, a right side 20 and a rear area 22 of the vehicle 10. The sensors 12 and 16 are shown positioned at opposite ends of the bumper 14 as one possible strategic location to define the desirable sensing area. However, as will be appreciated by those skilled in the art from the discussion of Applicant's embodiments and the prior art, the sensors 12 and 16 can be positioned at other locations on the vehicle 10 without significantly effecting the sensing regions around the vehicle 10. For example, the left side sensor 12 can be positioned at some location on the left side 18 of the vehicle 10, and the right side sensor 16 can be positioned at some location on the right side 20, as well as being positioned at other locations on the rear area 22 of the vehicle 10, without departing from the scope of the invention. U.S. patent application Ser. No. 08/177,266 to Chen et al., assigned to the assignee of the instant application, and herein incorporated by reference, discloses sensors of the types of sensors 12 and 16 being positioned within side view mirrors 24 of the vehicle 10.

Figure 2:
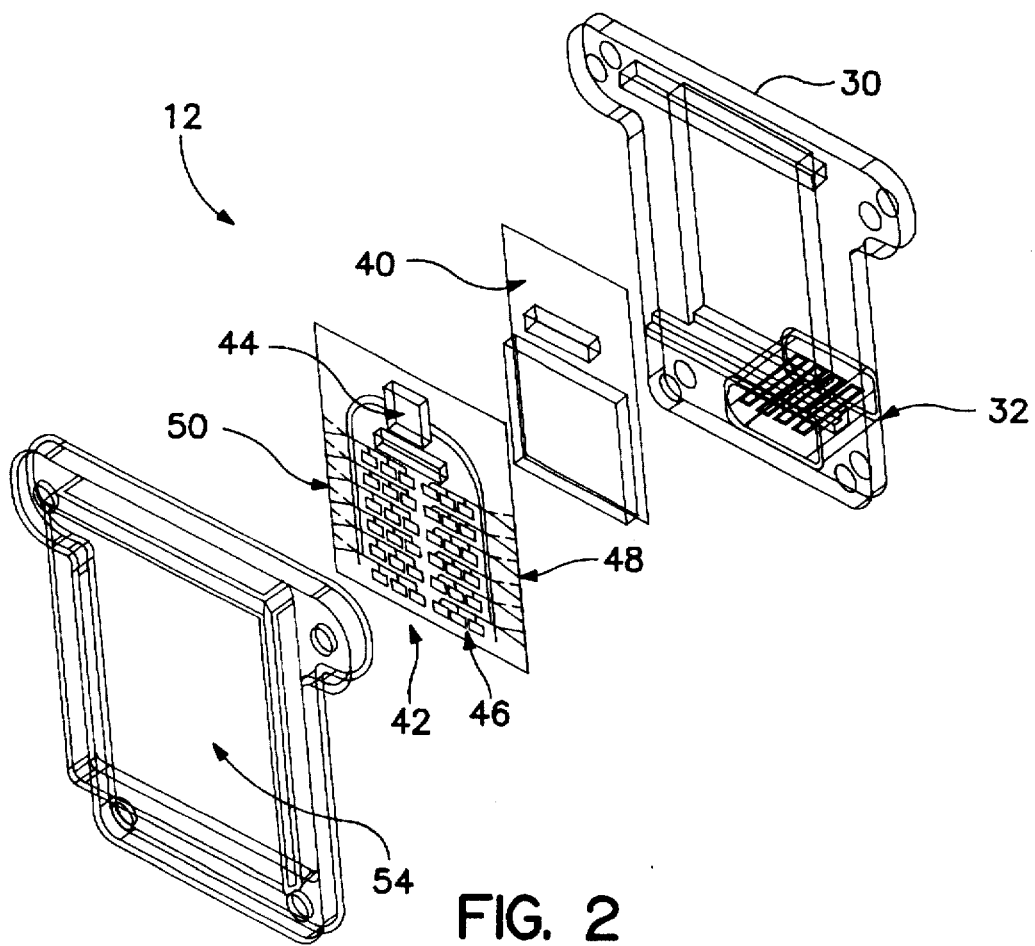
FIG. 2 is a blown apart perspective view of one sensor associated with the rear and side obstacle detection system of FIG. 1.
Figure 3:
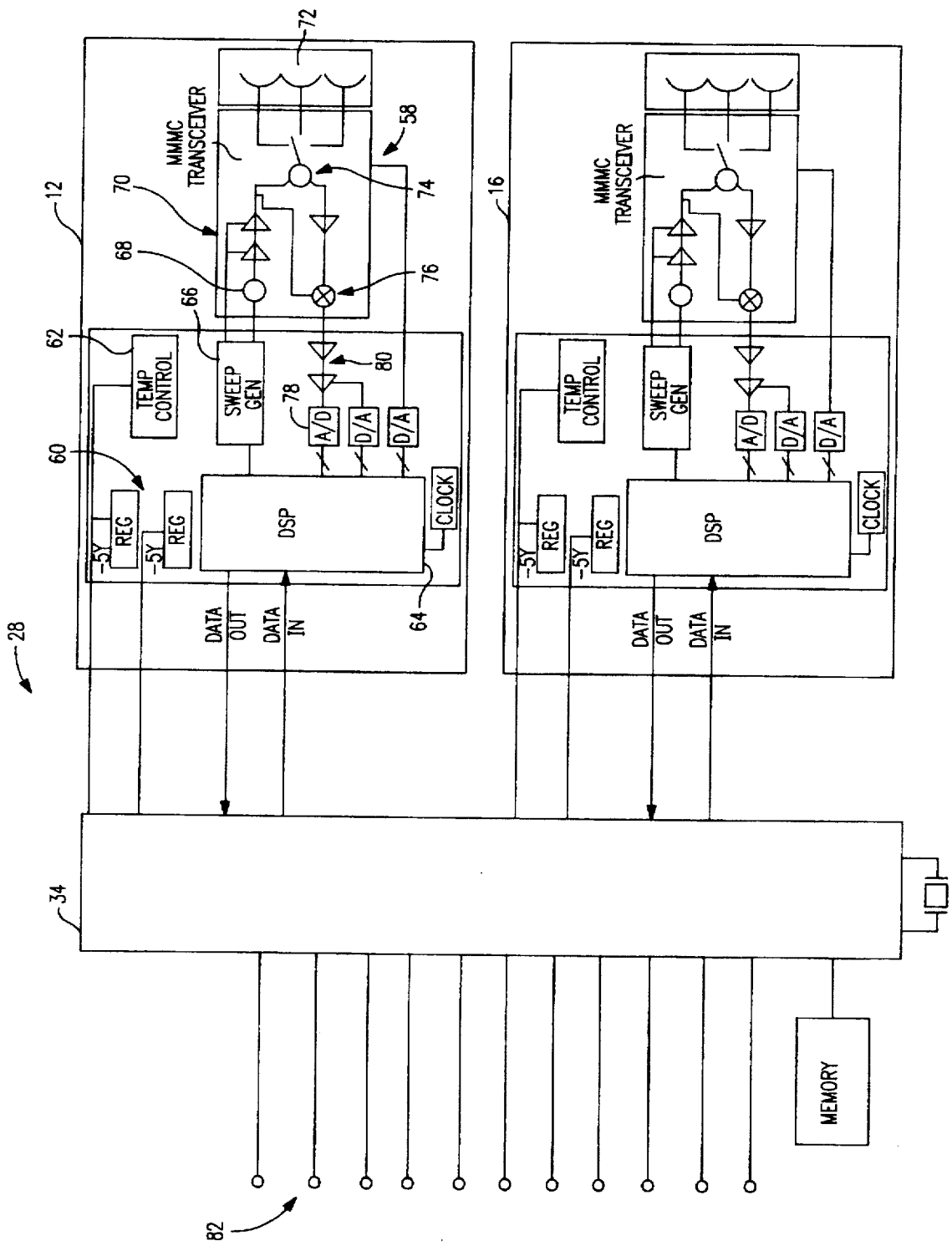
FIG. 3 shows a block diagram of the rear and side obstacle detection system of the present invention.

FIG. 2 shows a blown apart perspective view of the components of the sensor 12 according to an embodiment of the present invention. It will be understood that the sensor 16 includes the identical components of the sensor 12. FIG. 3 shows a block diagram of a rear and side detection system 28 according to one embodiment of the present invention incorporating the sensors 12 and 16. The sensor 12 includes a base member 30 on which is secured various sensor components. A connector lead frame 32 is provided to connect the sensor 12 to other circuit components, such as a system controller 34 and a vehicle battery (not shown). An intermediate frequency (IF) printed circuit board 40 is positioned on the base member 30 to provide connections from the lead frame 32 to an integrated circuit chip board 42. The chip board 42 includes a monolithic millimeter wave integrated circuit (MMIC) 44, a patch antenna array 46, a first end-fire slot antenna array 48 and a second end-fire slot array antenna 50. A cover 54 covers the sensor 12 and acts as a suitable protective layer to the sensor 12 from the environmental conditions that would exist at the rear of the vehicle 10. Additionally, the cover 54 is aesthetically matched to the design of the vehicle 10. U.S. patent application Ser. No. 08/177,266 referenced above depicts an alternate configuration of the different layers and components of a sensor of the type of the sensor 12 that is within the scope of the present invention.

The reason for the particular configuration of the antenna arrays 46, 48 and 50 will become apparent from the discussion below. It is stressed, however, that these antenna arrays are used by way of a non-limiting example in that other types of antennas, including dipoles and feed horns, can be incorporated within the scope of the invention. U.S. patent application Ser. No. 08/177,266 referenced above discusses other types of antenna configurations that may be suitable for the purposes described herein.

The sensor 12 utilizes MMIC technology to provide a suitable transceiver 58 for the purposes described herein. U.S. Pat. No. 5,315,303 issued to Tsou et al. assigned to the assignee of the instant application and herein incorporated by reference, discloses a monolithic millimeter wave integrated circuit transceiver and associated circuitry that is applicable for the purposes of the present invention. A general description of the operation of the sensors 12 and 16 will be given below that is adequate to describe the embodiments of the invention. However, it will be understood that a more detailed discussion of the operation of the sensor 12 can be gleaned from a detailed analysis of U.S. Pat. No. 5,315,303.

An appropriate voltage signal is applied from the vehicle battery through the controller 34 to voltage regulators 60 within the sensor 12. A temperature control device 62 monitors the temperature of the sensor 12. The sensor 12 is activated when an input signal from the controller 34 is applied to a digital signal processor (DSP) 64. The DSP 64 applies an output signal to a sweep generator 66 to generate an appropriate voltage signal. The voltage signal is applied to a voltage controlled oscillator (VCO) 68. The VCO 68 generates a millimeter wave frequency signal at the desirable frequency that is applied to a series of amplifiers 70. The amplified millimeter wave frequency signal is then systematically applied to a series of antenna 72 through a rotating switch 74 to radiate the frequency signal into space. The antenna 72 are intended to represent the patch antenna array 46 and the end-fire slot antenna arrays 48 and 50.

Signals that are reflected off of objects within the antenna fields defined by the antenna 72 are received by the antenna 72 and applied to a mixer 76 through the switch 74. The mixer 76 mixes the reflected signal with the frequency signal from the VCO 68 for timing purposes. The mixed signal from the mixer 76 is applied to an analog-to-digital converter 78 through a series of amplifiers 80. The digital signal representation of the reflected signal is applied to the DSP 64 for signal processing in a manner that will be discussed in greater detail below. If the DSP 64 determines that a warning signal should be issued as a result of the reflected signal, the DSP 64 will output an appropriate signal to the controller 34 that will in turn activate a suitable warning device (not shown).

The sensors 12 and 16 provide object detection and range/velocity measurement functions of detected objects, and the controller 34 performs the final warning decision processing as well as overall system control, self-test and vehicle interfacing. Further, the controller 34 provides watch dog functions and overall system diagnostics. A series of input and output lines 82 are connected to the controller 34. Input lines are provided to provide input signals to the controller 34 of when the sensors 12 and 16 should be activated. In one example, a determination of whether an obstacle exists at the right side of the vehicle 10 will be made when a right turn signal (not shown) is switched on, a determination of whether an obstacle exists on the left side of the vehicle will be made when a left turn signal (not shown) is switched on, and a determination of whether an obstacle exists at the rear of the vehicle 10 will occur when the vehicle 10 is switched into reverse. In an alternate example, the sensors 12 and 16 can be continuously activated to provide an indication as to whether an obstacle is around the rear and side of the vehicle 10 at all times of vehicle use. Indications of whether obstacles are present when the sensors 12 and 16 are activated is applied through the controller 34 to various types of warning devices (not shown), such as audible alarms and visual signals. For different applications, different levels of warnings can be given. For example, the system 28 can be designed such that a visual warning signal is given whenever an obstacle is within the range of the antenna 72, and a visual signal and an audible alarm can be given when an obstacle is in a zone that is critical for a particular left, right or back-up maneuver in response to activation of the left and right turn signals and the reverse gear.

The system 28 uses millimeter wave radar signals with a FM-CW chirped wave form. The FM-CW approach is well suited to low peak power MMIC transmitters, and is compatible with the current generation of low cost digital signal processors. Millimeter wave frequencies are desired to utilize small antenna, and to accommodate a 500 MHz bandwidth to enable one foot range resolution. One foot range resolution is desirable to fine tune the antenna coverage using range cutting to faithfully follow the desired detection areas. The patch antenna array 46 and the slot antenna arrays 48 and 50 transmit an appropriate millimeter wave radar signal, and receive reflected signals.

In one embodiment, the radar signals are emitted at 20 mW having greater than a 23 dB signal-to-noise ratio. This yields signal pulse detection probabilities of approximately 98% and negligible false alarms for targets with fluctuating cross sections. Five chirped pulses are transmitted within a 5 msec update period and a proximity detection criteria of three out of five return pulses exceeding adaptive thresholds (discussed below) in order to declare a detection. To provide the necessary processing capabilities, the controller 34 includes a suitable microprocessor such as the Motorola MC68HCO5B6 8-bit microcontroller having 6k bytes of masked read only memory (ROM), 512 bytes of erasable programmable read only memory (EPROM) and 256 bytes of random access memory (RAM). The DSP 64 can be a Texas Instruments TMC320C10 16-bit processor including 3k bytes of masked ROM and 288 bytes of RAM. The millimeter wave radar signal can be transmitted at various millimeter wave frequencies in the GHz frequency bands. For example, suitable frequency bands include 37.5–38.5 GHz, 76–77 GHz, 92–95 GHz, 140 GHz and 153 GHz. These components and parameters are just examples of suitable devices and system operations as it will be appreciated by those skilled in the art that others will be equally applicable within the scope of the invention.

Figure 4:
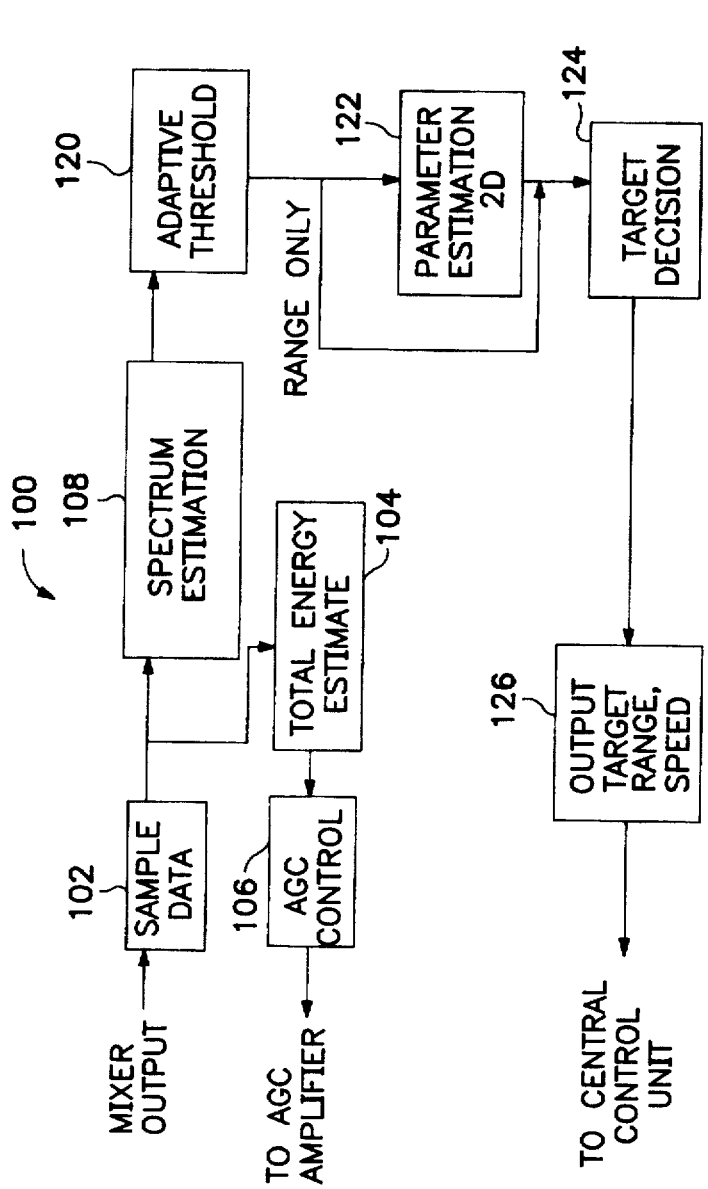
FIG. 4 shows a block diagram of the operation of the rear and side obstacle detection system of the invention.

FIG. 4 shows a block diagram of a system 100 depicting the operation of a portion of the DSP 64 when it receives a reflected signature signal. The discussion below will be general in nature as adequate for the present invention. A more detailed description of this operation can be found in U.S. patent application Ser. No. 08/173,540, filed Dec. 23, 1993, assigned to the assignee of the instant application, and herein incorporated by reference. The system 100 includes a data sampling device 102 that samples an output of the mixer 76 through the analog-to-digital processor 78. The mixer 76 combines the transmitted signal with the reflected signal to generate a mixer output signal related to the range of a detected object. If multiple objects are detected, the mixer output signal will be a sum of frequencies corresponding to each object. An output of the data sampling device 102 is applied to an energy estimation device 104 that estimates a total energy of the sampled mixer output signal. An automatic gain control device 106 generates a gain control signal for an automatic gain amplifier (not shown) associated with the sensor 12.

Figure 5:
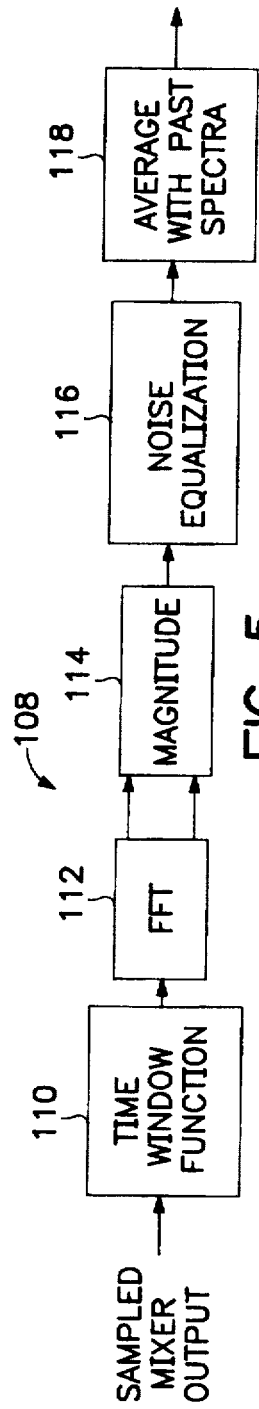
FIG. 5 shows a block diagram of a spectrum estimation device of the invention.

A spectrum estimation device 108 receives the sample data signal from the sample data device 102 to estimate the spectrum of the sampled mixer output signal. A more detailed block diagram of the spectrum estimation device 108 is shown in FIG. 5. A time domain window device 110 multiplies the sampled mixer output signal generated by the sample data device 102 with a time domain window function, for example a raised cosine function, to generate a windowed signal. The time domain window device 110 decreases spectrum leakage and outputs the windowed signal to a fast fourier transform (FFT) device 112 which generates a frequency spectrum signal. The frequency spectrum signal includes a series of spectral components.

The frequency spectrum signal is applied to a magnitude determining device 114 that calculates the magnitude of the spectral components, and generates a magnitude range profile signal. The magnitude range profile signal includes a plurality of range bins where each range bin is associated with a spectral component and contains the magnitude of the associated spectral component. The magnitude of each spectra-component is related to signal strength at a particular frequency. Signal strength relates to the presence or absence of objects at a given range. In addition, the frequency of a peak of the frequency signal is related to the distance of a target.

The magnitude range profile signal is then applied to a noise equalization device 116. Because the sampled mixer signal has a noise characteristic which increases with decreasing frequency, the magnitude range profile signal is equalized by the noise equalization device 116 to produce an equalized range profile signal having a noise floor that is constant with respect to frequency. The equalized range profile signal is applied to an averaging or integration device 118 which integrates the equalized range profile signal with prior equalized range profile signals to increase the signal-to-noise ratio so as to increase the detection probability.

The averaging device 118 generates an integrated range profile signal which is applied to an adaptive threshold device 120. The adaptive threshold device 120 defines a moving window that includes a plurality of range bins. The adaptive threshold device 120 evaluates the signal strength of each range bin and generates target flags in the range bins to indicate the presence or absence of an object. The adaptive threshold device 120 is implemented with one form of a constant false alarm rate algorithm to have a predictable false alarm rate based on the signal-to-noise ratio of the system 100. This algorithm determines the amplitude threshold which potential objects must be above to be recognized. Anything below the threshold is discarded as noise. The threshold changes in both range and time, and thus is adaptive to changing conditions of clutter, object size and distance. Various types of adaptive threshold techniques are discussed with reference to U.S. patent application Ser. No. 08/173,540 referenced above.

For the lane change target prediction mode of operation, a 2D parameter estimation device 122 determines target distance and velocity. The 2D parameter estimation device 122 performs computations on a 2D object space array generated by the adaptive threshold device 120, and generates a 2D estimation signal including components related to the speed of and distance to possible detected objects. Only objects greater than the threshold range profile signal are analyzed and only the object paths which correlate closely enough to constant velocity motion pass the thresholding. An object is valid if it persists over enough thresholding intervals, and if its path is correlated to a relatively non-accelerating path. This estimate is then used to determine if the object will be within side detection zones within one second as will be discussed below. The algorithm utilizes the transform from two dimensional range-time space to range-time velocity space. This algorithm has superior clutter rejection properties and rejects objects that are out of the allowed velocity limits.

For rear and side object detection where only range is needed, the 2D parameter estimation algorithm is not performed, and the process moves to a target detection decision device 124. A target decision algorithm determines whether the object is valid and if it should be sent on to the controller 34. If the target decision device 124 determines that an object is present that may cause a potential collision, the target decision device 124 outputs a signal to an output target range and speed device 126 to give the appropriate object range and speed data to the controller 34.

Figure 6:
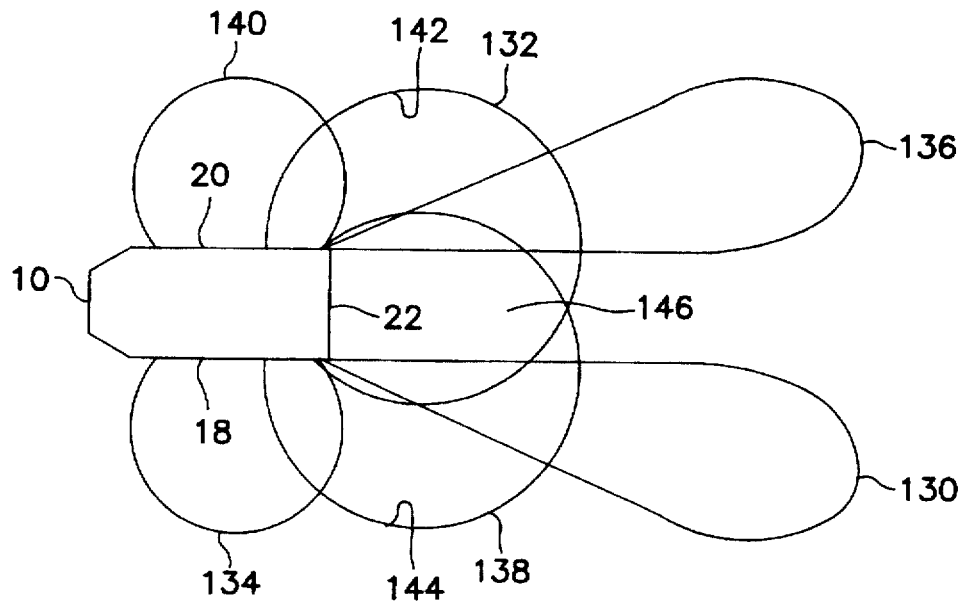
FIG. 6 is a top view of the vehicle of FIG. 1 depicting a plurality of sensing regions established by the rear and side obstacle detection system around the vehicle according to an embodiment of the present invention.
Figure 7:
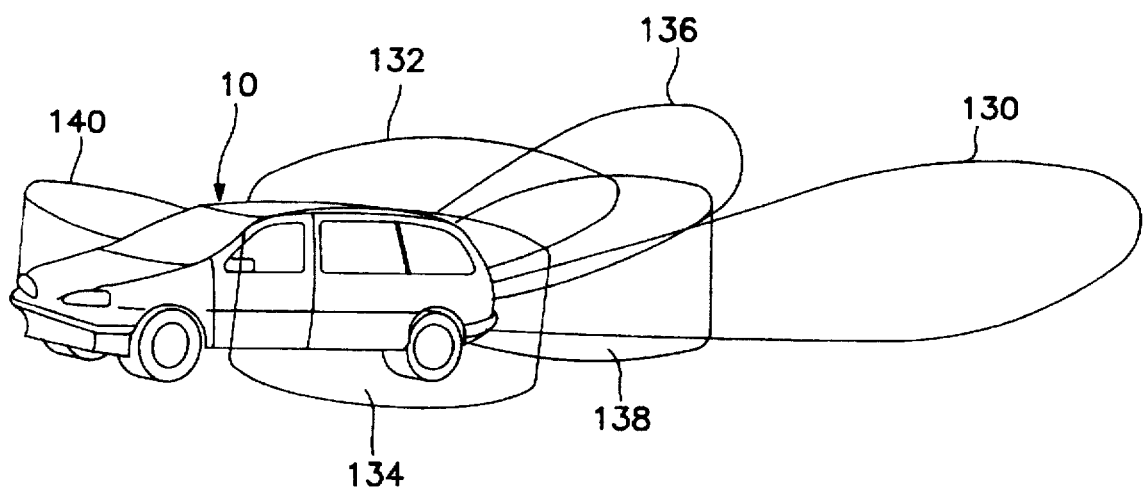
FIG. 7 is a perspective view of the vehicle of FIG. 6 depicting the plurality of sensing regions.

FIG. 6 shows a top view and FIG. 7 shows a perspective view of the vehicle 10 and a plurality of sensing regions defined by the sensors 12 and 16 at the left side 18, the right side 20 and the rear area 22 of the vehicle 10. Each antenna array of the sensors 12 and 16 radiates a frequency signal into space that is limited to a particular shape and distance so as to define a sensing region such that a reflected signal from an object in the sensing region is detected by the antenna array that created the region. Particularly, the patch antenna array 46 of the sensor 12 is configured to define a sensing region 130, the end-fire slot antenna array 48 is configured to define a sensing region 132, and the end-fire slot antenna array 50 is configured to define a sensing region 134. Likewise, the patch antenna array of the sensor 16 is configured to define a sensing region 136 and the end-fire slot antenna arrays of the sensor 16 are configured to define sensing regions 138 and 140. As would be well understood to those skilled in the art, the types of antenna arrays discussed herein can be accurately designed at particular power levels to be limited to desirable antenna fields. The shape of the sensing regions 132, 134, 138 and 140 generated by the end-fire slot antenna arrays are typical 90° beam width antenna fields produced by a dipole antenna.

In one example, the end-fire slot antenna arrays are configured to give a 15° beam width in the vertical direction to limit the vertical coverage of the sensing regions 132, 134, 138 and 140 to the height of the vehicle 10, and a 90° beam width in the horizontal direction. The sensing regions 132, 134, 138 and 140 extend out from the vehicle 10 to a distance within the range of about nine feet to about twelve feet to limit the coverage area to the adjacent lanes. The power of the sensors 12 and 16 can be adjusted to increase or decrease this area for specific applications. The patch antenna arrays have a 15° beam width with a 13° bore sight angle to provide for long range coverage without spill over into either the lane occupied by the vehicle 10 or two lanes over on either side of the vehicle 10. In this example, the regions 130 and 136 extend to about fifty feet behind the vehicle 10. It is stressed that the specific beam coverage of the different sensing regions 130-140 can be adjusted by altering the power and antenna configuration and size to provide for different modifications of coverage for different applications within the scope of the invention.

Appropriate algorithms associated with the digital signal processors of the sensors 12 and 16 allow the system 28 to use logic to analyze detection in the six sensing regions 130-140 to provide a reliable indication of potential collision threatening obstacles. Range and vehicle speed of detected obstacles are combined in the digital signal processors to determine whether a warning is to be issued.

Sensing coverage for lane changing and merging purposes is attained on the right side 20 of the vehicle 10 by defining a right side detection zone by logically combining the sensing regions 132, 136, 138 and 140. The right side detection zone is defined by the sensing region 140 and a portion 142 of the sensing region 132. A front portion of the right side 20 is covered by the sensing region 140. A detection within the sensing region 140 will produce a right side detection warning. For detection of a rear portion of the right side 20 of the vehicle 10, the decision to issue a warning is based upon the presence or absence of object detections at the same positional location relative to the vehicle as determined by range measurements of a detected object within the sensing regions 132, 136 and 138. If an object is detected in the sensing region 132 at a particular position, but an object is not detected at that position in either the sensing region 136 or the sensing region 138, then the detected object is contained in the portion 142 of the region 132 that does not include any of the regions 134 and 138. In this situation a right side warning is issued. If, however, an object is detected at a particular position in the sensing region 132, and is also detected at that position in one of the detecting regions 136 or 138, then the object is not within the region 142, and therefore the object is not within the right side detection zone. Thus, the right side warning signal is not activated.

The same logic holds true for a left side detection zone at the left side 18 of the vehicle 10 determined by a logical combination of the sensing regions 130, 132, 134 and 138. The left side detection zone is defined by the sensing region 134 and a portion 144 of the sensing region 138. A front portion of the left side 18 is covered by the sensing region 134. A detection within the sensing region 134 will produce a left side detection warning. For detection of a rear portion of the left side 18 of the vehicle 10, the decision to issue a warning is based upon the presence or absence of object detections at the same position in the sensing regions 130, 132 and 138. If an object is detected in the sensing region 138 at a particular position, but an object is not detected at that position in either the sensing region 130 or the sensing region 132, then the detected object is contained in the portion 144 of the region 138 that does not include the regions 130 and 132. In this situation, a left side warning signal is activated. If, however, an object is detected in the sensing region 138 at a particular position, and is also detected in either of the sensing regions 130 or 132 at that position, then the object is not within the portion 144, and therefore the object is not within the left side detection zone. Thus, the left side warning is not activated.

In order to detect approaching vehicles moving relative to the vehicle 10 in the adjacent lanes to the vehicle 10 that may enter the left or right side detection zone for lane changing and merging purposes, the long range sensing regions 130 and 136 are employed. For a detected object in the sensing regions 130 and 136, the change in range of the object will be determined, and a left or right side warning signal will be issued if the predicted time for that object to enter the left or right side detection zones is less than a predetermined time interval. A one second time interval is used by way of a non-limiting example. Other time periods may also be applicable for different environments. The one second time interval is selected as the time an approaching vehicle will have time to stop before colliding with the vehicle 10 for relative vehicle speeds of about 30 mph. This long range coverage has been designed to detect target objects only in the adjacent lane out to a distance of about 50 feet.

In order to cover a detection zone behind the vehicle 10, a combination of the sensing regions 130, 132, 136 and 138 are employed. The system 28 will issue a back-up warning if an object is detected in an overlap region 146 of the sensing regions 132 and 138. In other words, the antenna arrays that create the sensing regions 132 and 138 must each detect an object at the same position for a back-up warning to be issued. In order to avoid an ambiguity that may exist when coincident objects are present separately in the sensing regions 132 and 138 at the same range and outside of the overlapping region 146, object detections in the sensing regions 130 and 136 are also monitored for back-up detection. If an object appears in the sensing region 130 at the same position as an object in the sensing region 138, or if an object appears in the sensing region 136 at the same position as an object in the sensing region 132, then it is assumed that two separate objects are present off to the side of the region 146, and therefore no back-up warning is issued.

The system 28 also has the capability of providing back-up warnings for impending backing collisions which may occur during curved path back-up maneuvers. Simple analysis can show that for many curved path back-up maneuvers, the region 146 may not be applicable to provide a timely warning. This is because the object will not necessarily be in the region 146 until just before impact. Therefore, it may be necessary to monitor all of the sensing regions 130–140 during reverse operation. Right side 20 coverage could be produced by utilizing the area of region 132, but excluding the areas of regions 138 and 140. Likewise, left side 18 coverage could be produced by utilizing the area in region 138, but excluding the areas in regions 132 and 134.

The foregoing discussion discloses and describes merely exemplary embodiments of the present invention. One skilled in the art will readily recognized from such discussion, and from the accompanying drawings and claims, that various changes, modifications and variations can be made therein without departing from the spirit and scope of the invention as defined in the following claims.

What is claimed is:

1. A rear obstacle detection system for detecting obstacles around a vehicle, said system comprising:

at least one radiation beam signal source that generates a frequency signal;

a plurality of antenna responsive to the frequency signal, each of the plurality of antenna transmitting a radiation beam in a controlled manner to define a plurality of separate sensing regions around the vehicle, wherein a first sensing region is defined around a right side rear portion of the vehicle and a second sensing region is defined around a left side rear portion of the vehicle, said first and second sensing regions overlapping to define a rear detection zone directly behind the vehicle, said plurality of antenna further defining a third sensing region that extends behind and to a right side of the vehicle and overlaps the first sensing region and a fourth sensing region that extends behind and to a left side of the vehicle and overlaps the second sensing region, said plurality of antenna being responsive to radiation signals that are reflected off of obstacles within the first, second, third and fourth sensing regions so as to generate a signal indicative of a reflected intensity of the reflected signal; and a control device responsive to the signals from the plurality of antenna, said control device generating a rear obstacle detection signal if an object is detected in the first and second sensing regions at approximately the same position within the rear detection zone, and said control device preventing the rear obstacle detection signal from being generated if an object is detected in the third and fourth sensing regions outside of the rear detection zone.

2. The system according to claim 1 wherein the rear detection zone extends behind the vehicle within a range of approximately nine feet to approximately fifteen feet.

* * * * *